United States Patent Office 2,738,273
Patented Mar. 13, 1956

2,738,273

METHOD OF PRESERVING NATURAL RUMEN MICROORGANISMS AND PRODUCT WHICH RESULTS THEREFROM

Merle Muhrer, Columbia, Mo.

No Drawing. Application April 16, 1953, Serial No. 349,310

13 Claims. (Cl. 99—2)

This invention relates to a method of preserving natural rumen microorganisms and the product which results therefrom for use in establishing desirable rumen flora in ruminants, particularly cattle and sheep, and for the inoculation of fermentation vats. In recent years it has been noted that the number of microorganisms present in the rumen and reticulum of ruminants is a most important factor in the satisfactory functioning of the alimentary system required for the health and nutrition of such animals.

No single species of microorganism is responsible for the complete digestion of a particular food constituent, and there is an interdependence among the various kinds of microorganisms for their proper functioning. Therefore, if the microorganisms become deficient in number and/or the various species get out of balance through upset by disease, drugs or poisons, inadequate food intake or even a sudden change of feed, functioning of the rumen is impaired and the animal is slow to recover. This is particularly true because the microorganisms are required to produce enzymes capable of digesting cellulose-containing materials which the ruminants consume for food. Also the microorganisms make nutrients available in other ways such as in the synthesis of amino acids and vitamins that are essential to the normal and rapid growth of an animal. This digestion of cellulose and production of amino acids and vitamins can also be brought about in properly controlled fermentation vats containing feed stuffs and inoculated with the rumen microorganisms.

It has been determined that the young of ruminants develop more rapidly and may be put on cellulose-containing foods earlier when inoculated with rumen microorganisms. Ordinarily an animal obtains the microorganisms from older ruminants under usual field and grazing conditions and the microorganisms multiply with sufficient rapidity to maintain health of the animal, but when the microorganisms become deficient in kind and/or population, sufficient viable symbiotic microorganisms can be artificially supplied to the rumen of the deficient and/or ailing animal. Also when young ruminants are slow to become inoculated under natural field conditions through contact with older animals or when they are to be weaned, similar inoculations may be introduced into the rumen of the young to more rapidly develop the rumen and establish the enzymes necessary for the digestion of various cellulose-containing materials such as hay and other roughages.

Since, to be most effective, all of the essential species of microorganisms must be included in such inoculations it has been the practice to use natural rumen material from a normal ruminant and to transfer the ingesta to the rumen of an animal to be treated. The result of this method is satisfactory providing the donor is free from disease and that the ingesta does not contain toxic materials. The health of the donor can be ascertained by ante-mortem and post-mortem examination. It is obvious that such examination cannot be carried out under field conditions. Therefore, the direct transfer method is potentially dangerous to the operator and recipient even aside from the distasteful and odorous job of obtaining and transferring the natural rumen material.

An alternate and more satisfactory method, particularly for the convenience of the veterinarian is the use of some form of prepared substance which contains the rumen microorganisms. However, previously it has been impossible to cultivate the many species of microorganisms under controlled conditions.

The most practical method is to obtain the rumen material from large meat-packing houses and to process the material into a form whereby the microorganisms may be introduced by convenient dosage containing suitable numbers of viable microorganisms of the essential species.

It is, therefore, the object of the present invention to provide such a product and method of producing the same.

In accomplishing this and other objects of the invention, I have provided an improved method for producing a product containing the viable microorganisms which are required.

In carrying out the invention, ruminant animals such as sheep or cattle are used as a source of the raw material to assure that the material contains all of the essential species of microorganisms. The material may be obtained from the rumen in several ways. For example, cuds can be removed from the mouth of rumen animals when they are in the natural process of rumination or the natural contents of the rumen may be obtained directly from the rumen by means of a stomach pump and tube, or the animal may be slaughtered and the rumen removed by a mid-line section. Regardless of the method used, the donor animals should be free from disease and show no evidence of rumen dysfunction.

The most satisfactory source is meat-packing houses where either cattle or sheep are being slaughtered. At such plants the rumen material is available in large quantities and the animals have been previously inspected ante-mortem, post-mortem for disease. When obtained by this method, the rumen material is of satisfactory quality. The rumen content which is obtained, regardless of the source, is placed in containers that may be hermetically sealed and transported to the laboratory or processing plant within a short period of time, preferably within two hours. The temperature of the material should never be allowed to get above 40° C. and the seal should be maintained until the processing is started.

In starting the processing, the rumen material is placed within a blender or similar apparatus and is chopped and agitated for approximately five minutes or until the temperature reaches 40° C. This step is for the purpose of dislodging and freeing microorganisms that may be clinging to fibers or other materials in the natural rumen material and thereby greatly increase the recovery of the microorganisms. The blended rumen material is then filtered through a layer of coarse cheesecloth, or the like, with enough pressure being applied to separate the liquid and small particles, including the microorganisms, from the coarser material. After the filtration step, the filtrate which contains the microorganisms is then centrifuged. The supernatant liquid is then decanted leaving the microorganisms in a paste-like layer at the bottom of the centrifuge bottle. The paste containing the microorganisms is then removed from the bottom of the centrifuge bottle and mixed thoroughly with a substance which will have a protective function for the microorganisms such as a chemical which may modify the oxidation-reduction potential such as dried whole milk and ascorbic acid.

For example, when milk and ascorbic acid are used, the proportions are approximately 12 grams of dried whole milk and 0.5 gram of ascorbic acid per 100 ml. of the microorganism paste. The ascorbic acid alters the oxidation-reduction potential and enables a greater number of microorganisms to withstand the freeze-drying process and may also provide greater vitality of the microorganisms during storage of the ultimate product; that is, it retards loss of life of the microorganisms during the drying process and storage period, thereby assuring that the ultimate product, when used, contains the required number and balance of the different essential species of microorganisms.

The dehydrated milk also functions during the freeze-drying process to protect and retard loss of life of the bacteria. The use of dehydrated milk over liquid milk also has the advantage in reducing the amount of liquid that must be removed during the freeze-drying process.

The microorganism, milk, and ascorbic acid mixture is then frozen and lyophilized. This is effected by placing the mixture in evaporating dishes, bottles, or other containers, and subjecting it to a temperature of approximately −40° C. The frozen mixture may remain under these conditions for several days without appreciably decreasing viability of the microorganisms because of the protecting effect afforded by the milk and ascorbic acid content of the frozen mixture.

After freezing, the frozen mixture is placed in an evacuation apparatus and subjected to less than 1,000 microns Hg pressure and allowed to remain until the mixture is dry. When dry, the microorganisms are stored in airtight containers out of direct sunlight and kept in dormant state at normal room temperature.

The product thus produced contains a maximum number of viable organisms of the essential species which are needed to accomplish the desired results when used for inoculations as previously described.

The product may be stored over long periods without appreciable loss in viability of the microorganisms and without substantial change in the ratio of the different species. A rumen microorganism product thus produced is in a form ready to be used without further preparation by the veterinarian and it is easily administered in proper dosage to ruminants having digestive disorders or having altered rumen microorganisms brought about by drugs, disease, dietary deficiencies, or other causes.

The product may also be administered to inoculate the rumen of young ruminants thus providing the proper microflora more rapidly than would be accomplished under conditions of chance inoculation. Thus inoculated, these young animals can utilize common feedstuffs at an earlier age with a resulting increased early growth rate and added economy.

The rumen microorganism product or the paste may be used to digest cellulose and produce amino acids and vitamins in fermentation vats containing feedstuffs to provide a prepared food product for various animals.

What I claim and desire to secure by Letters Patent is:

1. A method of promoting viability of rumen microorganisms in the preparation of a product containing dormant rumen microorganisms including separating small particles and liquid which contain the microorganisms from natural rumen material, adding milk and ascorbic acid to said particles and liquid containing the microorganisms, and freeze-drying the mixture.

2. A method of promoting viability of rumen microorganisms in the preparation of a product containing dormant rumen microorganisms including separating small particles and liquid material which contain the microorganisms from natural rumen material, adding milk and ascorbic acid to particles and liquid material containing the microorganisms in the proportions of approximately 12 grams of dried milk and 0.5 gm. of ascorbic acid per 100 ml. of the microorganism containing material, and freeze-drying the mixture.

3. A method of promoting viability of rumen microorganisms in the preparation of a product containing dormant rumen microorganisms including separating small particles and liquid material which contain the microorganisms from natural rumen material, adding a microorganism protective substance and an oxidation reducing chemical to said microorganism containing material, and freeze-drying the mixture.

4. A method of promoting viability of rumen microorganisms in the preparation of a product containing rumen microorganisms in dormant state including chopping and agitating rumen material for freeing the microorganisms from particles of the rumen material, removing coarse components of the material from portions of the material which contain the microorganisms, decanting supernatant liquid from the portions of the material containing the microorganisms to leave a paste containing the microorganisms, adding dried milk and ascorbic acid to the paste for protecting the microorganisms and modifying the oxidation-reduction potential of the paste, and freeze-drying the paste.

5. A method of promoting viability of rumen microorganisms in the preparation of a product containing rumen microorganisms in dormant state including freeing the microorganisms from particles of the rumen material, removing coarse components of the material from portions of the material which contain the microorganisms, decanting supernatant liquid from the portions of the material containing the microorganisms to leave a paste containing the microorganisms, adding milk and ascorbic acid to the paste for protecting the microorganisms and modifying the oxidation-reduction potential of the paste, and freeze-drying the paste.

6. A method of promoting viability of rumen microorganisms in the preparation of a product containing rumen microorganisms in dormant state including freeing the microorganisms from particles of the rumen material, removing coarse components of the material from the portions of the material which contain the microorganisms, decanting supernatant liquid from the portions of the material containing the microorganisms to leave a paste containing the microorganisms, adding milk and ascorbic acid to the paste in the proportions of approximately 12 grams of milk and 0.5 gram of ascorbic acid per 100 ml. of the paste for protecting the microorganisms and modifying the oxidation-reduction potential of the paste, and freeze-drying the paste.

7. A method of promoting viability of rumen microorganisms in the preparation of a product containing rumen microorganisms including freeing the microorganisms from fibrous elements of the material, filtering the material to separate liquid and small particle components from coarse components of the material to obtain the microorganisms in the filtrate, centrifuging the filtrate to decant the supernatant liquid and leave a paste containing the microorganisms, adding milk and ascorbic acid to the paste for protecting the microorganisms and modifying the oxidation-reduction potential of the paste, freezing the paste mixture, subjecting the frozen paste mixture to vacuum until dry, and storing the dried product.

8. A method of promoting viability of rumen microorganisms in the preparation of a product containing rumen microorganisms including freeing the microorganisms from fibrous elements of the material, filtering the material to separate liquid and small particle components from coarse components of the material to obtain the microorganisms in the filtrate, centrifuging the filtrate to decant the supernatant liquid and leave a paste containing the microorganisms, adding dried milk to the paste for protecting the microorganisms, freezing the milk-containing paste at a temperature of approximately −40° C., and subjecting the frozen paste to vacuum until dry.

9. A method of promoting viability of rumen microorganisms in the preparation of a product containing rumen microorganisms in dormant state including chopping and agitating rumen material for freeing the microorganisms from particles of the rumen material, removing coarse components of the material from the portions of the material which contain the microorganisms, centrifuging and decanting supernatant liquid from the portions of the material containing the microorganisms leaving a paste containing the microorganisms, adding milk and ascorbic acid to the paste, and drying the paste for protecting the microorganisms by modifying the oxidation-reduction potential of the paste by freezing thereof.

10. A method of promoting viability of the rumen microorganisms in the preparation of a product containing rumen microorganisms in dormant state including chopping and agitating rumen material for freeing the microorganisms from particles of the rumen material, removing coarse components of the material from the portions of the material which contain the microorganisms, centrifuging and decanting supernatant liquid from the portions of the material containing the microorganisms leaving a paste containing the microorganisms, by modifying the oxidation-reduction potential of the paste by adding milk and ascorbic acid to the paste, and freeze-drying the paste.

11. A product for use in establishing desirable flora in ruminants including a dry mixture of milk, ascorbic acid, and dormant rumen microorganisms.

12. A product for use in establishing desirable flora in ruminants comprising a dry mixture of milk, ascorbic acid, particles of rumen material containing dormant rumen microorganisms in the proportion of substantially 12 grams of dry milk, and substantially 0.5 gram of ascorbic acid per 100 ml. of the rumen material.

13. A product of the character described comprising a paste containing milk, ascorbic acid and particles of rumen material having rumen microorganisms, the milk and ascorbic acid having the function of protecting the microorganisms by modifying the oxidation-reduction potential of the paste.

References Cited in the file of this patent

UNITED STATES PATENTS 2,560,830   Turner _____ July 17, 1951
2,700,611   Jeffreys _____ Jan. 25, 1955

OTHER REFERENCES

Porter: Bact. Chem. & Phy., Wiley, N. Y. C., 1946, pages 55 and 56.

Flosdorf: Freeze-drying, Reinhold Pub. Corp., N. Y. C., 1949, page 88.